(12) United States Patent
Xu et al.

(10) Patent No.: US 9,172,516 B2
(45) Date of Patent: Oct. 27, 2015

(54) METHOD, SYSTEM AND DEVICE FOR TRANSMITTING DOWNLINK PILOTS

(75) Inventors: Jing Xu, Beijing (CN); Deshan Miao, Beijing (CN); Shaohui Sun, Beijing (CN); Yu Ding, Beijing (CN); Guojun Xiao, Beijing (CN); Jun Chen, Beijing (CN)

(73) Assignee: CHINA ACADEMY OF TELECOMMUNICATIONS TECHNOLOGY, Beijing (CN)

(*) Notice: Subject to any disclaimer, the term of this patent is extended or adjusted under 35 U.S.C. 154(b) by 713 days.

(21) Appl. No.: 13/504,955

(22) PCT Filed: Nov. 1, 2010

(86) PCT No.: PCT/CN2010/001747
§ 371 (c)(1),
(2), (4) Date: Jul. 17, 2012

(87) PCT Pub. No.: WO2011/050589
PCT Pub. Date: May 5, 2011

(65) Prior Publication Data
US 2012/0281688 A1 Nov. 8, 2012

(30) Foreign Application Priority Data

Nov. 2, 2009 (CN) .......................... 2009 1 0237048
Dec. 31, 2009 (CN) .......................... 2009 1 0227799

(51) Int. Cl.
*H04L 5/00* (2006.01)
*H04L 27/26* (2006.01)

(52) U.S. Cl.
CPC ............ *H04L 5/0048* (2013.01); *H04L 5/0051* (2013.01); *H04L 5/0007* (2013.01); *H04L 5/0016* (2013.01); *H04L 27/2613* (2013.01)

(58) Field of Classification Search
None
See application file for complete search history.

(56) References Cited

U.S. PATENT DOCUMENTS

| 7,729,433 | B2 * | 6/2010 | Jalloul et al. ................... 375/260 |
| 8,140,929 | B2 * | 3/2012 | Kim et al. ....................... 714/749 |
| 8,315,225 | B2 * | 11/2012 | Xu et al. ......................... 370/330 |
| 8,335,274 | B2 * | 12/2012 | Jongren .......................... 375/267 |

(Continued)

FOREIGN PATENT DOCUMENTS

| CN | 101373999 A | 2/2009 |
| CN | 101064546 A | 10/2010 |

OTHER PUBLICATIONS

Provisional Application 61/212659, "Multi-user MIMO transmissions in wireless communication systems", Zhang et al., Apr. 14, 2009.*

(Continued)

*Primary Examiner* — Gregory Sefcheck
(74) *Attorney, Agent, or Firm* — Kilpatrick Townsend & Stockton LLP

(57) ABSTRACT

A method, apparatus and system for downlink pilot transmission solve the problem of power differences among OFDM symbols caused by Walsh Codes. The transmission method is that dedicated pilots are transmitted in the manner of code division multiplexing (CDM) or hybrid of CDM and frequency division multiplexing (FDM), wherein the dedicated pilots are configured with orthogonal sequence sets according to a preset frequency-domain granularity and rules on the resources for transmitting the dedicated pilots, and the same orthogonal sequence set is employed for the dedicated pilots in each frequency-domain granularity.

12 Claims, 16 Drawing Sheets

(56) References Cited

U.S. PATENT DOCUMENTS

| | | | |
|---|---|---|---|
| 8,358,669 B2* | 1/2013 | Meylan et al. | 370/474 |
| 8,369,885 B2* | 2/2013 | Zhang et al. | 455/522 |
| 8,588,161 B2* | 11/2013 | Lee et al. | 370/329 |
| 8,619,693 B2* | 12/2013 | Noh et al. | 370/329 |
| 8,750,257 B2* | 6/2014 | Chung et al. | 370/335 |
| 8,755,812 B2* | 6/2014 | Pan et al. | 455/452.2 |
| 8,842,515 B2* | 9/2014 | Lee et al. | 370/209 |
| 8,934,446 B2* | 1/2015 | Ko et al. | 370/330 |
| 8,982,834 B2* | 3/2015 | Noh et al. | 370/330 |
| 2010/0061360 A1* | 3/2010 | Chen et al. | 370/342 |
| 2012/0033643 A1* | 2/2012 | Noh et al. | 370/335 |
| 2012/0250656 A1* | 10/2012 | Noh et al. | 370/330 |

OTHER PUBLICATIONS

3GPP Draft R1-090875, Qualcomm, Feb. 9-13, 2009.
3GPP Draft R1-091385, Nortel, Mar. 23-27, 2009.
3GPP Draft R1-093303, Nokia Siemens, Aug. 24-28, 2009.
3GPP Draft R1-093503, NTT Docomo, Aug. 24-28, 2009.
3GPP Draft R1-094135, CATT, Oct. 12-16, 2009.

* cited by examiner

METHOD, SYSTEM AND DEVICE FOR TRANSMITTING DOWNLINK PILOTS

CROSS REFERENCE TO RELATED APPLICATIONS

The present application is a U.S. National Stage of International Application No. PCT/CN2010/001747, filed on Nov. 1, 2010, designating the United States, and claiming the benefits of Chinese Patent Application no. 200910237048.3, filed with the Chinese Patent Office on Nov. 2, 2009 and entitled "Method, apparatus and system for transmitting downlink pilots", and no. 200910227799.7, filed with the Chinese Patent Office on Dec. 31, 2009 and entitled "Method, apparatus and system for transmitting downlink pilots", all of which are hereby incorporated by reference in their entireties.

FIELD OF THE INVENTION

The present invention relates to the field of communications and particularly to a method, apparatus and system for transmitting downlink pilots.

BACKGROUND OF THE INVENTION

The new technologies of High-order Multi-Input Multi-Output (MIMO), multi-cell cooperative transmission, etc., will be adopted in a 3GPP Long Term Evolution (LTE)-Advanced system, i.e., the advancement of an LTE system, which is an evolved system of a third-generation mobile communication system, to improve the performance of the system.

Dedicated pilots are adopted in the LTE-A system to demodulate data in order to better support the new technologies. A dedicated pilot corresponds to a data stream, and pilots keep orthogonal between respective streams. In a transmission scheme with rank1 and rank2, orthogonality between pilots of the two streams is ensured in the Code Division Multiplexing (CDM) mode; in a transmission scheme with rank3 and rank4, orthogonality between pilots of the four streams is ensured in hybrid of Frequency Division Multiplexing (FDM) and CDM mode; and in a transmission scheme with rank5, rank6, rank7 and rank8, orthogonality between pilots of the eight streams is ensured in hybrid of FDM and CDM mode. As can be apparent, the CDM mode is involved for the pilots in all the transmission schemes. When Walsh codes or a normalized Walsh codes are adopted as pilots in the CDM mode, the power sum of pilots over one Orthogonal Frequency Division Multiplexing (OFDM) symbol may differ from that over another so that the power of one OFDM symbol may differ from that of another.

SUMMARY OF THE INVENTION

The invention provides a method, apparatus and system for transmitting downlink pilots to address the problem in the prior art of different power over different OFDM symbols.

A method for transmitting downlink pilots according to an embodiment of the invention includes:
transmitting dedicated pilots in the Code Division Multiplexing, CDM, mode or in hybrid of CDM and Frequency Division Multiplexing, FDM, mode, wherein:
the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity.

A apparatus for transmitting downlink pilots according to an embodiment of the invention includes:
a configuring unit configured to configure dedicated pilots with orthogonal sequence sets over resources for transmission of the dedicated pilots according to a preset frequency-domain granularity and rule by adopting the same orthogonal sequence set for the dedicated pilots in each frequency-domain granularity; and
a first transmission unit configured to transmit the dedicated pilots in the Code Division Multiplexing, CDM, mode or in hybrid of CDM and Frequency Division Multiplexing, FDM, mode.

A method for receiving downlink pilots according to an embodiment of the invention includes:
receiving dedicated pilots according to obtained frequency-domain granularity information and rule, wherein the same orthogonal sequence set is adopted for the dedicated pilots in each frequency-domain granularity.

A apparatus for receiving downlink data according to an embodiment of the invention includes:
an obtaining unit configured to obtain frequency-domain granularity information and rule or configuration information of orthogonal sequence sets; and
a receiving unit configured to receive the dedicated pilots according to the obtained frequency-domain granularity information and the rule or configuration information of orthogonal sequence sets, wherein the same orthogonal sequence set is adopted for the dedicated pilots in each frequency-domain granularity.

A system for transmitting downlink data according to an embodiment of the invention includes:
a base station configured to transmit dedicated pilots in the Code Division Multiplexing, CDM, mode or in hybrid of CDM and Frequency Division Multiplexing, FDM, mode, wherein the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity; and
a user equipment configured to receive the dedicated pilots according to obtained frequency-domain granularity information and rule or configuration information of orthogonal sequence sets, wherein the same orthogonal sequence set is adopted for the dedicated pilots in each frequency-domain granularity.

In the embodiments of the invention, a frequency-domain granularity is preset, and dedicated pilots are transmitted in the Code Division Multiplexing (CDM) mode or in hybrid of CDM and Frequency Division Multiplexing (FDM) mode, wherein the dedicated pilots are configured with orthogonal sequence sets over resources for transmission of the dedicated pilots according to the preset frequency-domain granularity and rule and the same orthogonal sequence set is adopted for the dedicated pilots in each frequency-domain granularity to thereby address the problem of power differences among OFDM symbols caused by Walsh Codes.

DETAILED DESCRIPTION OF THE EMBODIMENTS

In order to address the problem that power of one OFDM symbol may differ from that of another due to a Walsh code, dedicated pilots are transmitted in the Code Division Multiplexing (CDM) mode or in hybrid of CDM and Frequency Division Multiplexing (FDM) mode in the embodiments of the invention, where dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity.

Figure 1:
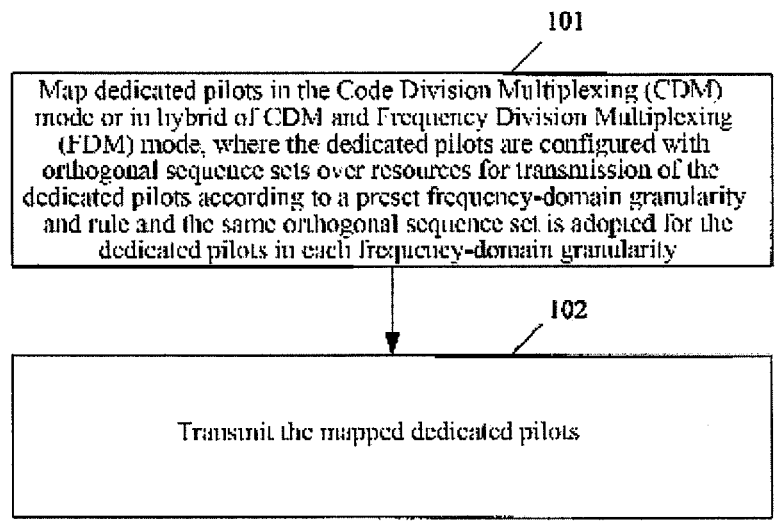
FIG. 1 is a schematic flow chart of a transmitting method according to an embodiment of the invention.

Referring to FIG. 1, a method for transmitting downlink pilots according to an embodiment of the invention includes:

In the step 101, dedicated pilots are mapped in the Code Division Multiplexing (CDM) mode or in hybrid of CDM and Frequency Division Multiplexing (FDM) mode, where the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity.

In the step 102, the mapped dedicated pilots are transmitted.

The frequency-domain granularity is a sub-carrier, a group of sub-carriers or a resource block PRB.

When the frequency-domain granularity is a sub-carrier, one orthogonal sequence set is adopted for each sub-carrier and different orthogonal sequence sets are adopted for adjacent sub-carriers among sub-carriers for transmission of the dedicated pilots in each resource block.

When the frequency-domain granularity is a group of sub-carriers, the same orthogonal sequence set is adopted in each group of sub-carriers and different orthogonal sequence sets are adopted between adjacent groups of sub-carriers among groups of sub-carriers for transmission of the dedicated pilots in each resource block.

When the frequency-domain granularity is a resource block PRB, the same orthogonal sequence set is adopted over the resource for transmission of the dedicated pilots in each resource block.

The dedicated pilots are configured with orthogonal sequence sets according to the preset rule as follows:

The dedicated pilots are configured with orthogonal sequence sets according to the orthogonal sequence set adopted for the starting PRB of a system bandwidth; or the dedicated pilots are configured with orthogonal sequence sets according to the orthogonal sequence set and the resource block scheduling sequence number, adopted for the starting PRB scheduled by user.

The dedicated pilots with the configured orthogonal sequence sets are transmitted to a user equipment so as to be provided to the user equipment for channel estimation.

When there is more than one group of ports and each group of ports corresponds to more than one sub-carrier, the dedicated pilots are transmitted over the same sub-carrier in each group of ports in the CDM mode, and a frequency-domain granularity and/or a rule preset for one group of ports may be the same as or different from that for another. A frequency-domain granularity and/or a rule preset for one rank-number of system transmission may be the same as or different from that for another. When different groups of ports correspond to a frequency-domain granularity which is a sub-carrier, different orthogonal sequence sets are adopted for adjacent sub-carriers for transmission of the dedicated pilots in the same group of ports, but different orthogonal sequence sets are adopted for starting sub-carriers of different groups of ports For example, when a rank-number of system transmission is 3 or 4, the same orthogonal sequence is adopted at data layers of transmission 1 and 3, and an orthogonal sequence at layer 4 is opposite to that at layer 2.

In the step 102, the dedicated pilots with the configured orthogonal sequence sets are transmitted to a user equipment so as to be provided to the user equipment for channel estimation. In a specific implementation, the configured orthogonal sequence sets can be transmitted to the user equipment in a broadcast message or Downlink Control Information (DCI). Of course, the orthogonal sequence sets may be not transmitted but, for example, stored in advance at the user equipment.

Figure 2:
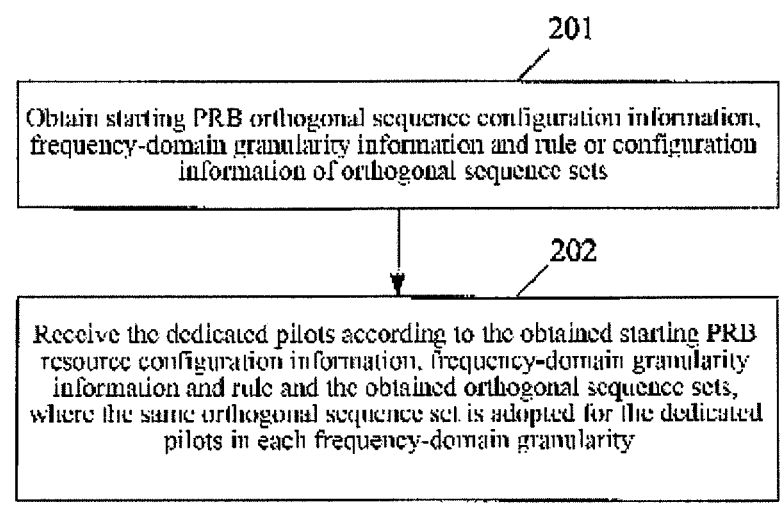
FIG. 2 is a schematic flow chart of a receiving method according to an embodiment of the invention.

Referring to FIG. 2, a method for receiving downlink pilots according to an embodiment of the invention includes the following steps:

The step 201 is to obtain frequency-domain granularity information and rule or configuration information of orthogonal sequence sets.

The frequency-domain granularity information and the rule may be configured in advance at the user equipment or updated with configuration information periodically received from the network.

The orthogonal sequence sets in the dedicated pilots may be obtained by receiving a broadcast message or a DCI message, transmitted from the base station, including orthogonal sequences, or the orthogonal sequence sets in the dedicated pilots may be stored in advance at the user equipment, or the orthogonal sequence sets in the dedicated pilots may be generated by the user equipment according to a rule stored in advance.

The step 202 is to receive the dedicated pilots according to the obtained frequency-domain granularity information and rule or configuration information of orthogonal sequence sets, where the same orthogonal sequence set is adopted for the dedicated pilots in each frequency-domain granularity.

In correspondence to the transmitting method illustrated in FIG. 1, the frequency-domain granularity as referred here to may also be a sub-carrier, a group of sub-carriers or a resource block PRB. A specific granularity in use may be preset by the system or adjusted dependent upon a condition of resources.

When the frequency-domain granularity is a sub-carrier, one orthogonal sequence set is adopted for each sub-carrier and different orthogonal sequence sets are adopted for adjacent sub-carriers among sub-carriers for transmission of the dedicated pilots in each resource block.

When the frequency-domain granularity is a group of sub-carriers, the same orthogonal sequence set is adopted in each group of sub-carriers and different orthogonal sequence sets are adopted between adjacent groups of sub-carriers among groups of sub-carriers for transmission of the dedicated pilots in each resource block.

When the frequency-domain granularity is a resource block PRB, the same orthogonal sequence set is adopted over resources for transmission of the dedicated pilots in each resource block.

In an embodiment of the invention, sub-carrier based and sub-carrier group based schemes are identical with rank1-rank2.

Figure 3A:
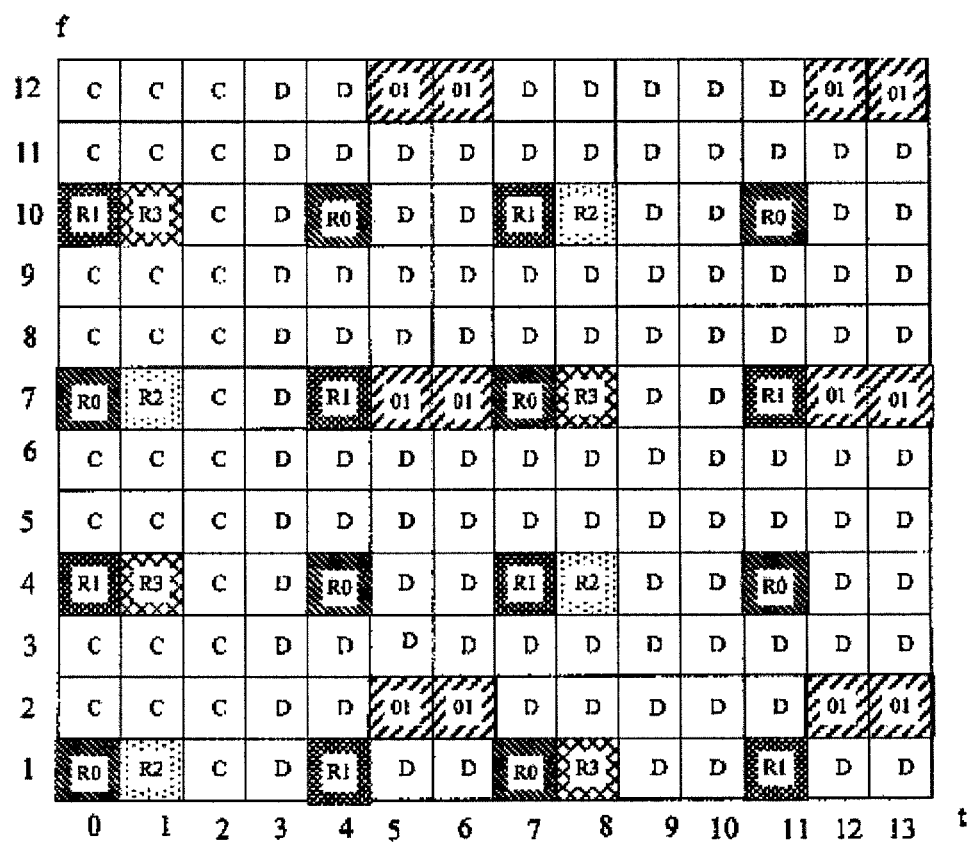
FIG. 3a is a schematic diagram of a rank1-rank2 pilot structure.

FIG. 3a is a schematic diagram of an LTE-A downlink dedicated pilot structure. Dedicated pilots are transmitted in the $2^{nd}$, the $7^{th}$ and the $12^{th}$ sub-carriers in OFDM symbols 5, 6, 12 and 13, where dedicated pilot symbols of dedicated pilot ports 0 and 1 are transmitted over sub-carriers in each OFDM symbol in the CDM mode. This embodiment takes what illustrated in FIG. 3a as an example, and this illustrated scheme will not be limited to any transmission mode.

Figure 3B:
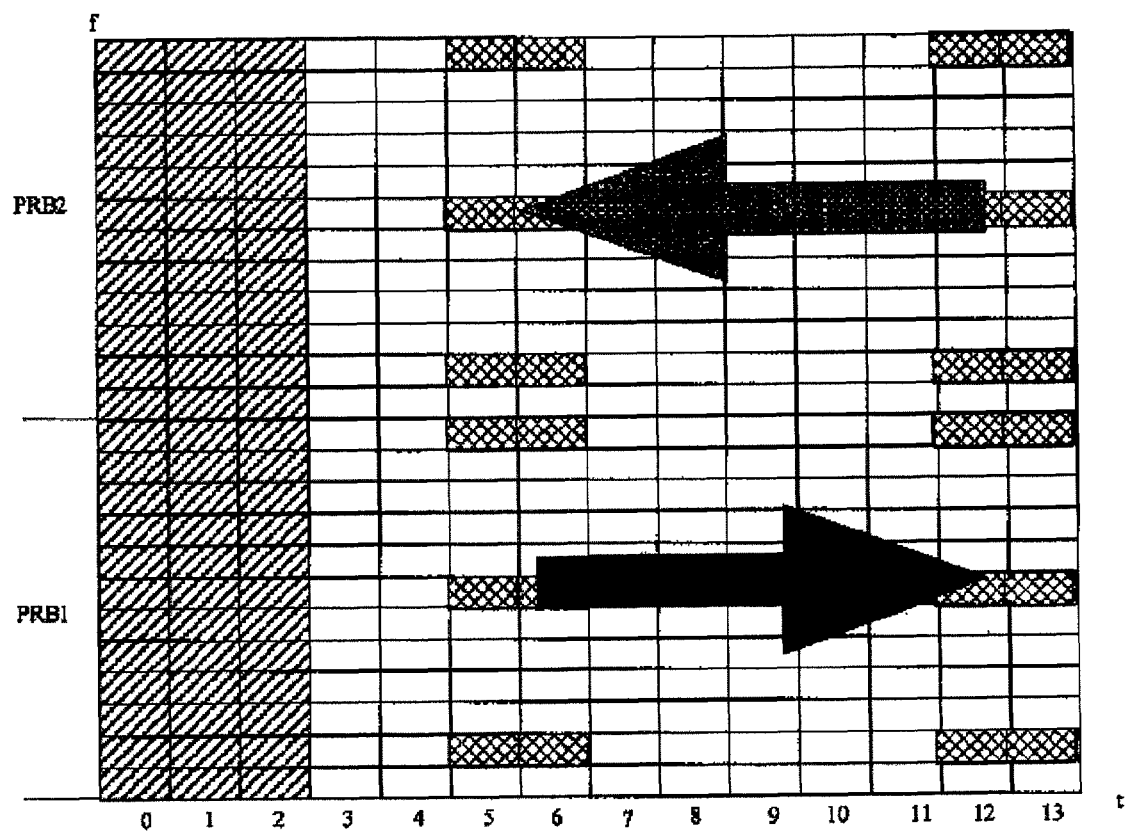
FIG. 3b is a schematic diagram of resource block PRB based inversion with rank2.

FIG. 3b is a schematic diagram of PRB based inversion with rank2. In this illustrated scheme, the horizontal axis represents time while the vertical axis represents frequency, the illustrated frame structure includes two PRBs with a shadowed zone representing a zone for transmission of dedicated pilots, and orthogonal sequence inversion (selection) can be performed per PRB, that is, orthogonal sequences of adjacent PRBs are different and the same orthogonal sequence applies in a PRB in the frequency domain. As illustrated in FIG. 3b, an arrow directed to the left represents a sequence [1 1; 1 –1] adopted in a corresponding zone for transmission of dedicated pilots in the PRB2 (the invention will not be limited to this sequence which is merely illustrative, and the same will apply hereinafter); and an arrow directed to the right represents [1 1; –1 1] adopted in the PRB1.

The index of an orthogonal sequence can be calculated in the formula of Code index=PRB_index mod 2.

The technical solution of the invention will be described below taking a rank3-rank4 pilot structure as an example.

Figure 4A:
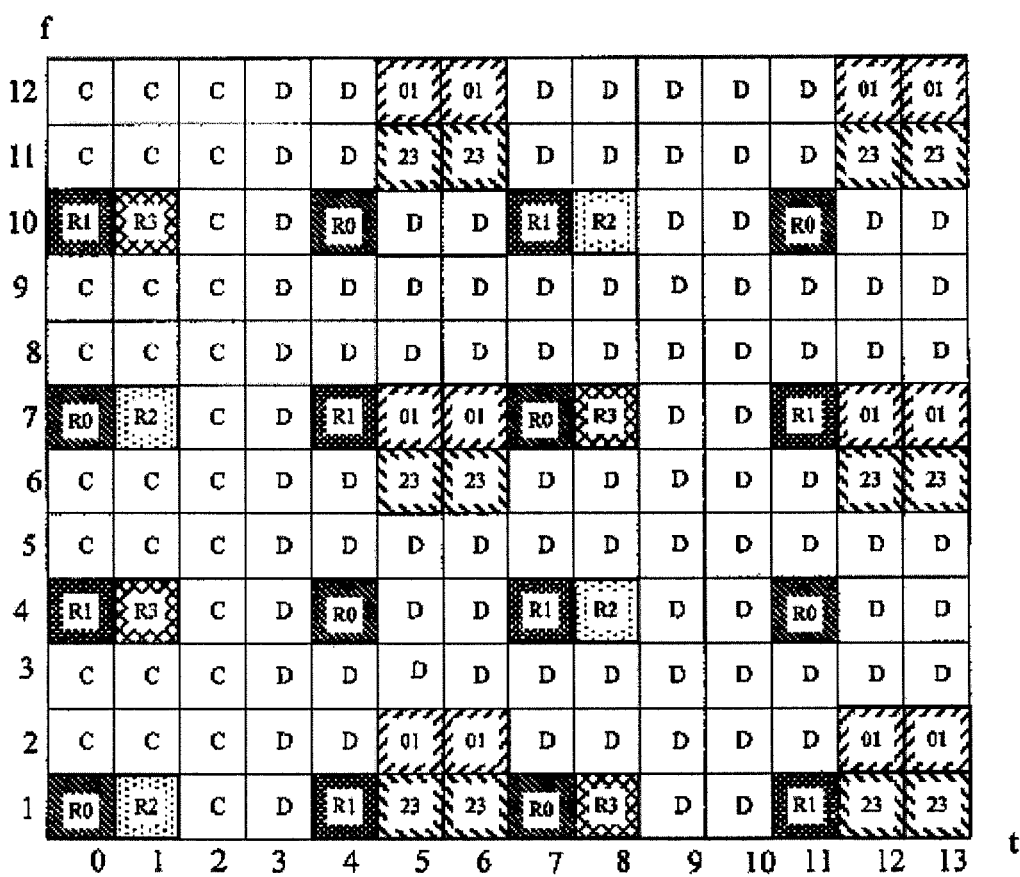
FIG. 4a is a schematic diagram of a rank3-rank4 pilot structure and a rank5-rank8 pilot structure.

Referring to FIG. 4a, the rank3-rank4 pilot structure results from increasing the number of supported ports in the frequency division (FDM) mode based upon rank1-rank2, and as illustrated in FIG. 4a, 23 corresponds to ports 7 and 8 and 01 corresponds to ports 9 and 10, which are distinguished in the frequency division (FDM) mode. The ports 7 and 8, and 9 and 10 are distinguished from each other in the CDM mode. That is, dedicated pilots are transmitted in the $1^{st}$, $2^{nd}$, $6^{th}$, $7^{th}$, $11^{th}$ and $12^{th}$ sub-carriers in OFDM symbols 5, 6, 12 and 13, where dedicated pilot symbols of the dedicated pilot ports 7 and 8 are transmitted over the $1^{st}$, $6^{th}$ and $11^{th}$ sub-carriers in the CDM mode, and dedicated pilot symbols of the dedicated pilot ports 9 and 10 are transmitted over the $2^{nd}$, $7^{th}$ and $12^{th}$ sub-carriers in the CDM mode.

Based upon the characteristic of the rank3-rank4 pilot structure, there are three general modes for orthogonal sequence group inversion (selection): per sub-carrier, per group of sub-carriers and per PRB, where each mode is implemented in two methods: orthogonal sequences are set for all the ports according to a uniform frequency granularity and rule; and orthogonal sequences are set for different ports or different groups of ports according to different frequency granularities and rules.

(1) Per sub-carrier: this scheme is characterized in different orthogonal sequence sets of adjacent sub-carriers.

Figure 4B:
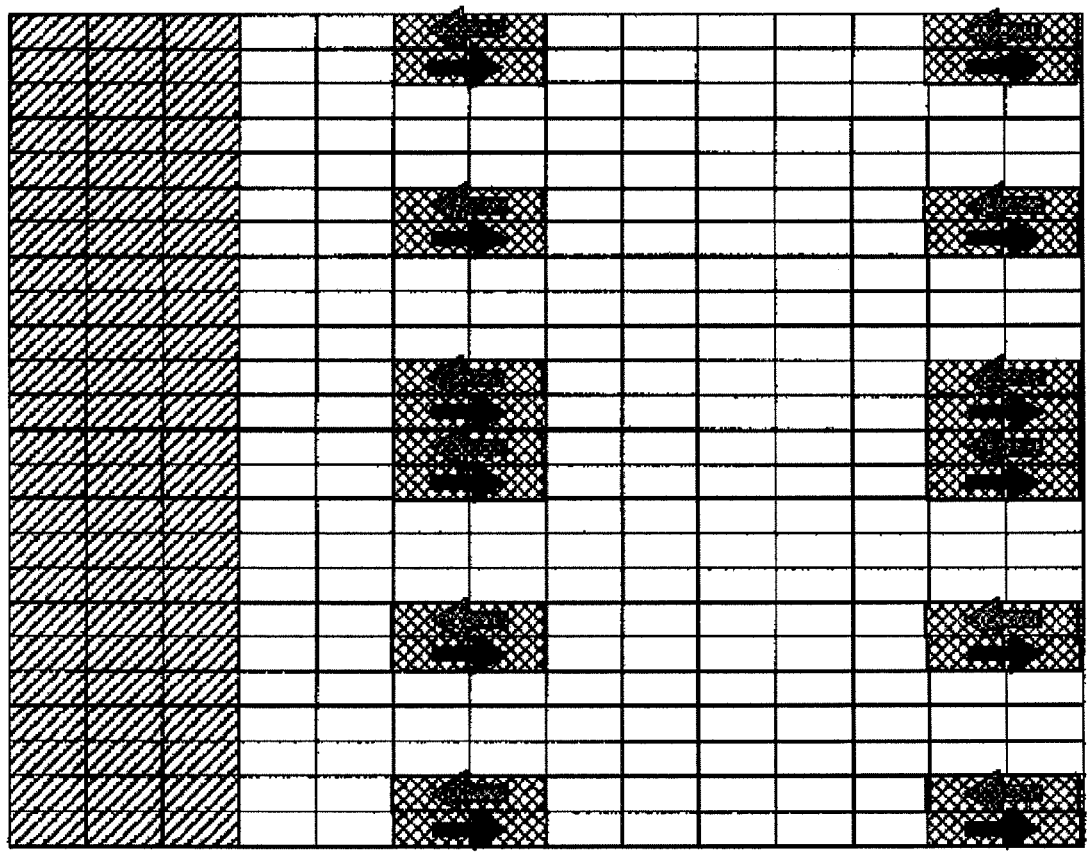
FIG. 4b is a schematic diagram of a sub-carrier based sequence selection scheme with rank3-rank4.

FIG. 4b is a schematic diagram of a sub-carrier based sequence selection scheme with rank3-rank4. As illustrated in FIG. 4b, an orthogonal sequence in a zone where an arrow directed to the left lies is Code index0: [1 1] [1 –1], and an orthogonal sequence in a zone where an arrow directed to the right lies is Code index1: [1 1] [–1 1]. The index of an orthogonal sequence can be calculated in one of the formulas of:

Code index=[6×PRB_index+intrasubcarrier_index] mod 2;

Code index=intrasubcarrier_index mod 2.

$$[6 \times \text{PRB\_index} + 2 \times \lfloor \text{intrasubcarrier\_index}/5 \rfloor + v_{shift}] \bmod 2,$$

$$v_{shift} = \begin{cases} 0 & \text{layer\_index} = 1, 2 \\ 1 & \text{layer\_index} = 3, 4 \end{cases}$$

Figure 4C:
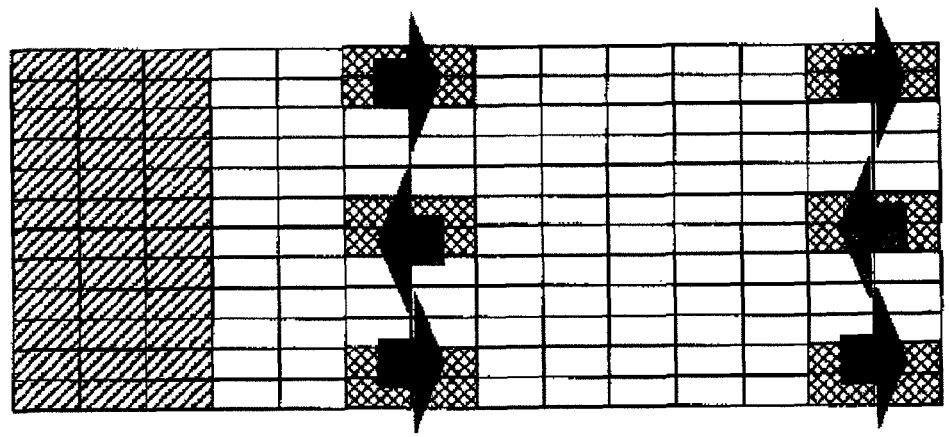
FIG. 4c is a schematic diagram of a sub-carrier group based sequence selection scheme with rank3-rank4.

(2) Per group of sub-carriers: this scheme is characterized in that firstly sub-carriers adjacent in a PRB are grouped so that there are three groups per PRB and two corresponding sub-carriers per group; and sequence inversion (selection) is performed per sub-carrier, that is, the same orthogonal sequence set is adopted for sub-carriers in a group and different orthogonal sequence sets are adopted for adjacent groups. FIG. 4c is a schematic diagram of a sub-carrier group based sequence selection scheme with rank3-rank4. As illustrated in FIG. 4c, an orthogonal sequence for transmission of dedicated pilots in a zone where an arrow directed to the left lies is Code index0: [1 1] [1 –1], and an orthogonal sequence in a zone where an arrow directed to the right lies is Code index1: [1 1] [–1 1]. The index of an orthogonal sequence can be calculated in one of the formulas of:

Code index=[PRB_index+⌊intrasubcarrier_index/5⌋] mod 2

Code index=[3×PRB_index+⌊intrasubcarrier_index/5⌋] mod 2

Figure 4D:
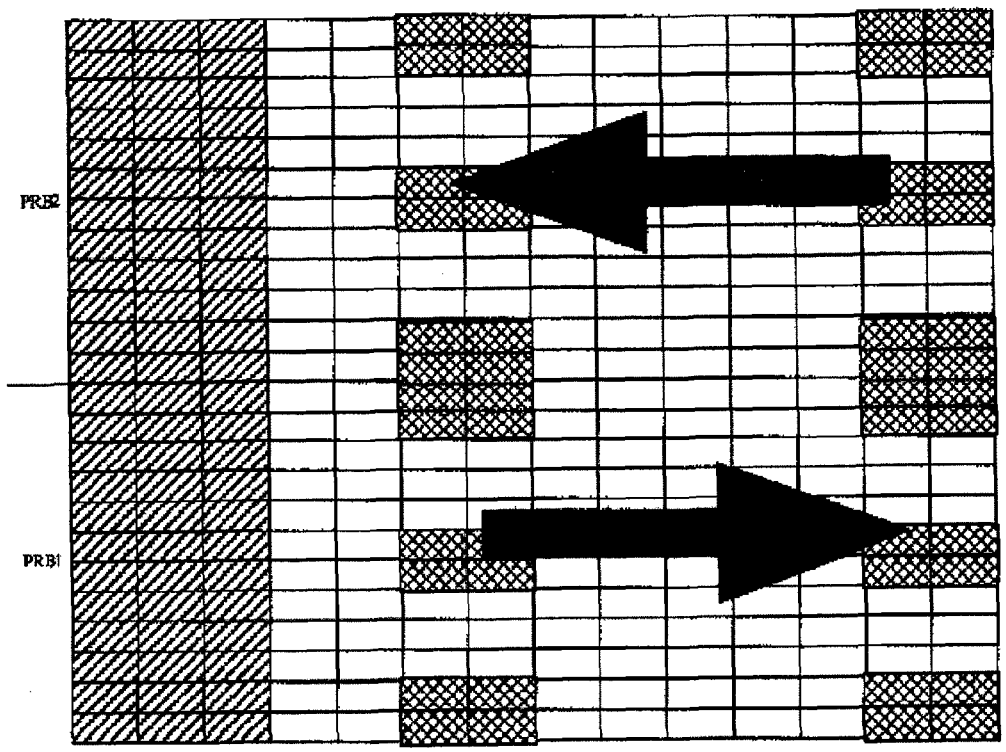
FIG. 4d is a schematic diagram of a PRB based sequence selection scheme with rank3-rank4.

(3) Per PRB: this scheme is characterized in different orthogonal sequence sets over adjacent PRBs. FIG. 4d is a schematic diagram of a PRB based sequence selection scheme with rank3-rank4. As illustrated in FIG. 4d, there are two PRBs illustrated in this scheme, where an arrow directed to the left represents an orthogonal sequence of Code index0: [1 1] [1 –1] in a zone for transmission of dedicated pilots in the PRB2, and an arrow directed to the right represents an orthogonal sequence of Code index1: [1 1] [–1 1] in a zone for transmission of dedicated pilots in the PRB1. The index of an orthogonal sequence can be calculated in the formula of:

Code index=PRB_index mod 2

Figure 4E:
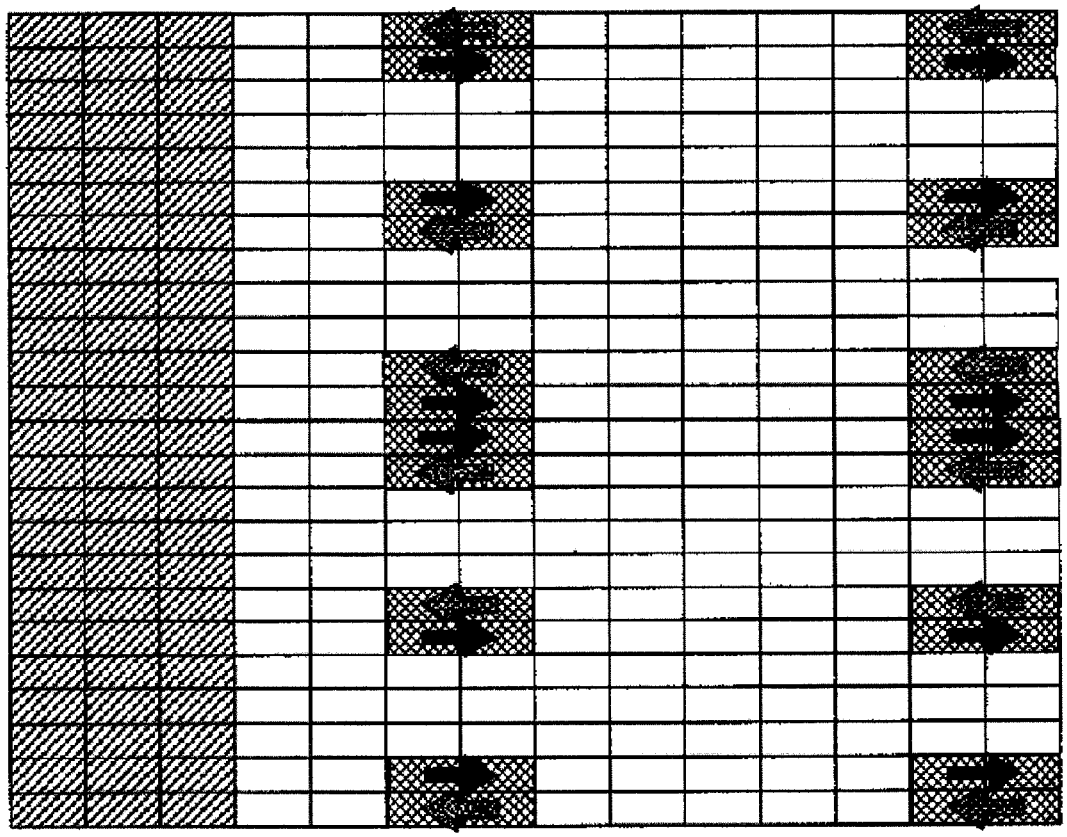
FIG. 4e is a schematic diagram of rank3-rank4 with a sequence mapping rule at layers 1 and 2 differing from that at layers 3 and 4.

(4) A rule adopted for streams 1 and 2 differs from that for streams 3 and 4: this scheme is characterized in that a frequency-domain granularity at which a sequence is mapped for the streams 1 and 2 is the same as that for the streams 3 and 4, but starting sub-carriers of different groups of ports correspond to different orthogonal sequence sets. Here a starting sub-carrier is the sub-carrier at the lowest frequency among sub-carriers corresponding to a group of ports. FIG. 4e is a schematic diagram of rank3-rank4 with a sequence mapping rule adopted for streams 1 and 2 differing from that for streams 3 and 4, and as illustrated in FIG. 4e, an orthogonal sequence in a zone where an arrow directed to the left lies is Code index0: [1 1] [1 −1], and an orthogonal sequence in a zone where an arrow directed to the right lies is Code index1: [1 1] [−1 1].

The technical solution of the invention will be described below taking a rank5-rank8 pilot structure as an example.

A scheme with rank5-rank8 at the length of an orthogonal sequence being 2 is the same as rank3-rank4 except that respective sequences correspond to different ports.

At the length of an orthogonal sequence being 4, there are two categories dependent upon a group of sequences in use: 1 of 2 sequences (merely sequence inversion) and 1 of 4 sequences, which will be described below:

In the first category, there are three specific modes for 1 of 2 sequences: per sub-carrier, per group of sub-carriers and per PRB.

Figure 5A:
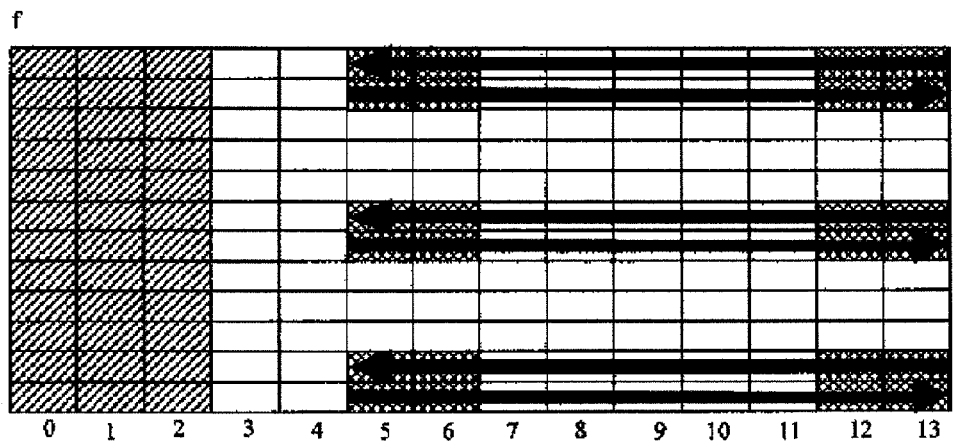
FIG. 5a is a sub-carrier based orthogonal sequence selection scheme with rank5-rank8 at a length of 4.

FIG. 5a illustrates a sub-carrier based orthogonal sequence selection scheme with rank5-rank8 at a length of 4.

Referring to FIG. 5a, in the sub-carrier based mode, an orthogonal sequence for transmission of dedicated pilots in a zone where an arrow directed to the left lies is Code index0: [1 1 1 1] [1 1 −1 −1][1 −1 −1 1][1 −1 1 −1]; and an orthogonal sequence related to an arrow directed to the right lies is Code index1: [1 1 1 1] [−1 −1 1 1] [1 −1 −1 1][−1 1 −1 1].

The index of an orthogonal sequence can be calculated in one of the formulas of:

Code index=[6×*PRB*_index+intrasubcarrier_index] mod 2

Code index=intrasubcarrier_index mod 2

Figure 5B:
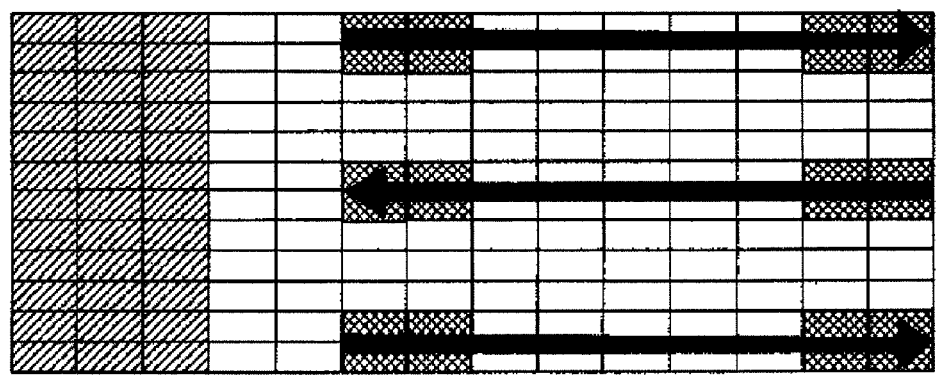
FIG. 5b is a sub-carrier group based orthogonal sequence selection scheme with PRB rank5-rank8 at a length of 4.

(2) FIG. 5b illustrates a sub-carrier group based orthogonal sequence selection scheme with PRB rank5-rank8 at a length of 4: an orthogonal sequence for transmission of dedicated pilots in a zone where an arrow directed to the left lies is Code index0: [1 1 1 1] [1 1−1 −1][1−1 −1 1][1 −1 1 −1]; and an orthogonal sequence in a zone where an arrow directed to the right lies is Code index1: [1 1 1 1] [−1 −1 1 1][1 −1 −1 1][−1 1 −1 1].

The index of an orthogonal sequence can be calculated in one of the formulas of:

Code index=[3×*PRB*_index+⌊intrasubcarrier_index/5⌋] mod 2.

Code index=[3×*PRB*_index+⌊intrasubcarrier_index/5⌋] mod 2

Figure 5C:
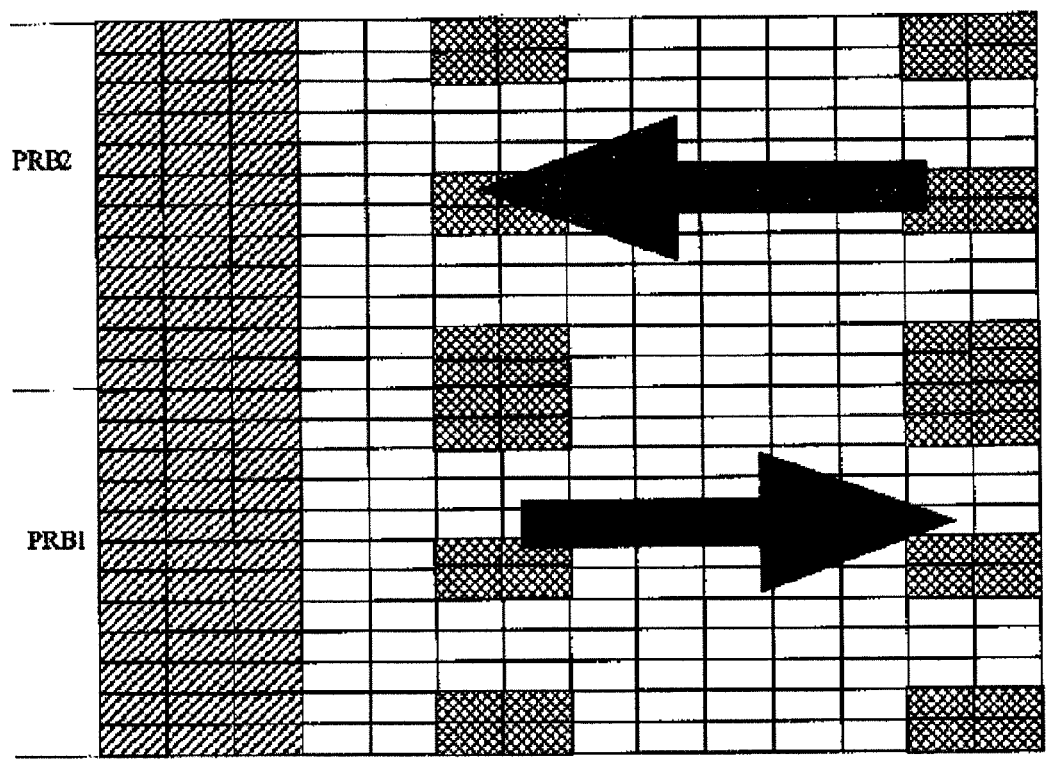
FIG. 5c is a PRB based orthogonal sequence selection scheme with rank5-rank8 at a length of 4.

(3) Referring to FIG. 5c, in a PRB based orthogonal sequence selection scheme with rank5-rank8 at a length of 4, an orthogonal sequence for transmission of dedicated pilots in a zone where an arrow directed to the left lies is Code index0: [1 1] [1 −1]; and an orthogonal sequence in a zone where an arrow directed to the right lies is Code index1: [1 1] [−1 1].

The index of an orthogonal sequence can be calculated in the formula of:

Code index=*PRB*_index mod 2

In the second category, there are three specific modes for 1 of 4 sequences: per sub-carrier, per group of sub-carriers and per PRB.

(1) Per sub-carrier:

In a transmission scheme with rank5, rank6, rank7 and rank8, orthogonality of pilots is ensured in hybrid of FDM and CDM mode as illustrated in FIG. 4a. Pilots per four streams correspond to one group of ports and are mapped onto the same resource, and orthogonality between pilot ports in a group of ports is ensured for pilots in the group in the code division mode. Different resources are allocated for different groups of ports to ensure orthogonality between pilot ports in the different groups, i.e., the FDM mode. As illustrated in FIG. 4a, resource elements numbered 01 and 23 represent two groups of pilot ports respectively. Furthermore pilots are actually configured with a consistent number of ports with the rank of data.

In the transmission scheme with rank5, rank6, rank7 and rank8, orthogonal sequences of pilots are mapped in the following method:

1) Different orthogonal sequence sets are adopted for starting sub-carriers for transmission of dedicated pilots in different groups of ports (hereinafter a sub-carrier will particularly refer to a sub-carrier for transmission of dedicated pilots);

(2) Different orthogonal sequence sets are adopted for adjacent sub-carriers in the same group of ports, for example, one group of ports is configured with two orthogonal sequence sets which are alternatively mapped; and (3) An orthogonal sequence set of a current sub-carrier is determined according to a predefined orthogonal sequence sets and the sequence number of the sub-carriers.

Figure 6A:
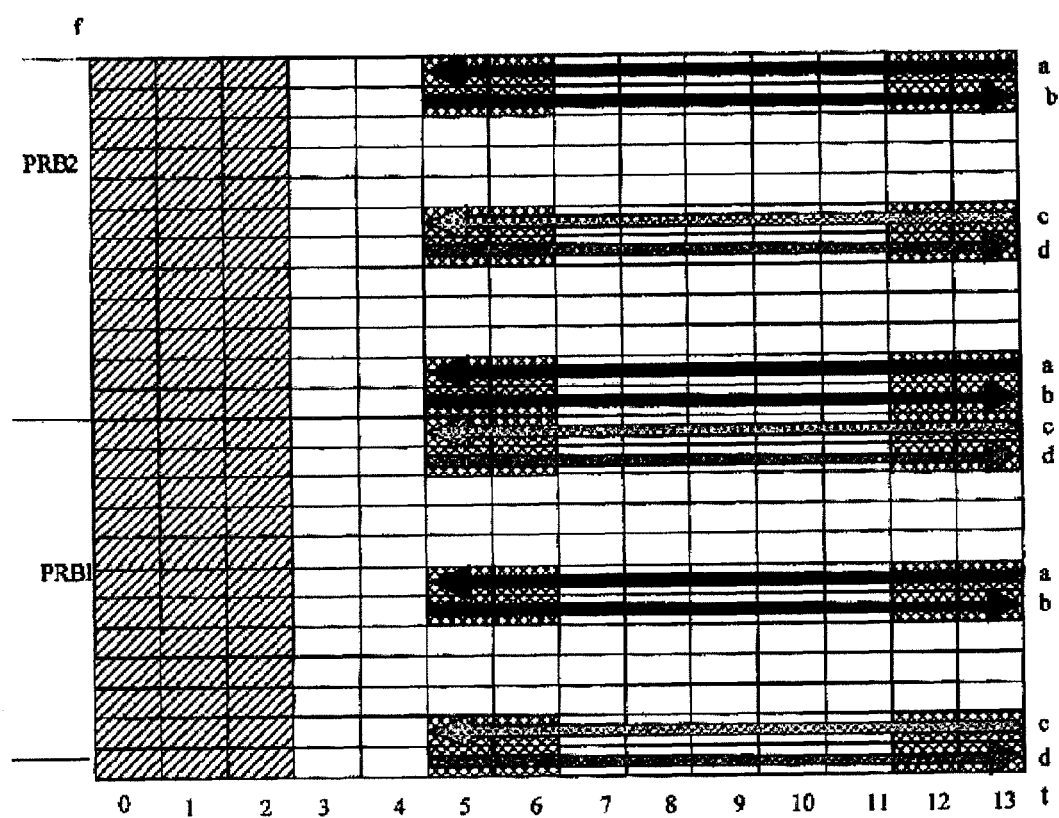
FIG. 6a is a sub-carrier based orthogonal sequence selection scheme with rank5-rank8 at a length of 4.

As illustrated in FIG. 6a, a group of ports 1 is configured with orthogonal sequence sets a and b which are alternatively mapped onto corresponding sub-carriers; and a group of ports 2 is configured with orthogonal sequence sets c and d which are alternatively mapped onto corresponding sub-carriers.

An orthogonal sequence for transmission of dedicated pilots in a zone where an arrow denoted with "a" lies is Code index0: [1 1 1 1] [1 1 −1 −1][1 −1 −1 1][1 −1 1 −1]; an orthogonal sequence for transmission of dedicated pilots in a zone where an arrow denoted with "b" lies is Code index1: [1 1 1 1] [−1 −1 1 1][1 −1 −1 1][−1 1 −1 1]; an orthogonal sequence for transmission of dedicated pilots in a zone where an arrow denoted with "c" lies is Code index2: [1 1 1 1] [−1 −1 1 1][−1 1 1 −1][1 −1 1 −1]; and an orthogonal sequence for transmission of dedicated pilots in a zone where an arrow denoted with "d" lies is Code index3: [1 1 1 1] [1 1 −1 −1][−1 1 1 −1][−1 1 1 −1].

$$\text{code\_index} = [6 \times \text{PRB\_index} + 2 \times \lfloor \text{intrasubcarrier\_index}/5 \rfloor + v_{shift}] \mod 4,$$

$$v_{shift} = \begin{cases} 0 & \text{layer\_index} = 1, 2, 3, 4 \\ 1 & \text{layer\_index} = 5, 6, 7, 8 \end{cases}$$

The corresponding sets of sequences of a, b, c and d will not be limited to the foregoing sets of sequences, and alike the method for calculating code_index will not be limited thereto.

Figure 6B:
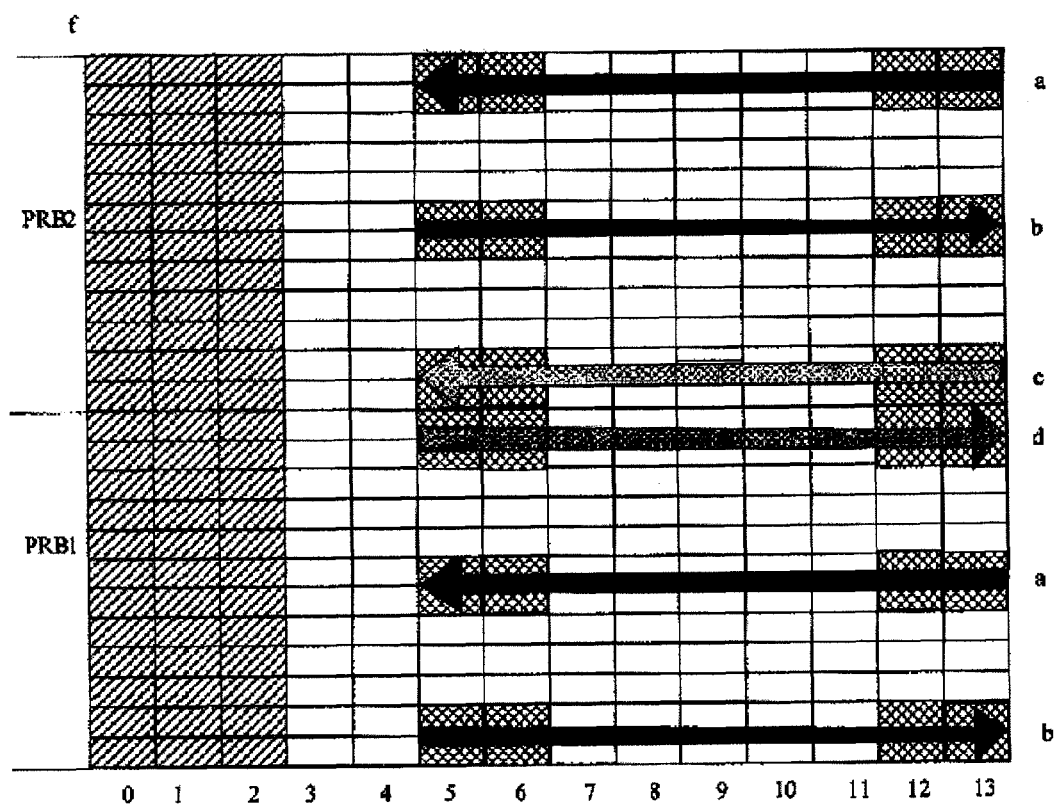
FIG. 6b is a sub-carrier group based orthogonal sequence selection scheme with rank5-rank8 at a length of 4.

(2) Per group of sub-carriers:

FIG. 6b is a sub-carrier group based orthogonal sequence selection scheme with rank5-rank8 at a length of 4. Referring to FIG. 6b, an orthogonal sequence for transmission of dedicated pilots in a zone where an arrow denoted with "a" lies is Code index0: [1 1 1 1] [1 1 −1 −1][1 −1 −1 1][1 −1 1 −1]; an orthogonal sequence for transmission of dedicated pilots in a zone where an arrow denoted with "b" lies is Code index1: [1

1 1 1] [−1 −1 1 1][1 −1 −1 1][−1 1 −1 1]; an orthogonal sequence for transmission of dedicated pilots in a zone where an arrow denoted with "c" lies is Code index2: [1 1 1 1] [−1 −1 1 1][−1 1 1 −1][1 −1 1 −1]; and an orthogonal sequence for transmission of dedicated pilots in a zone where an arrow denoted with "d" lies is Code index3: [1 1 1 1] [1 1 −1 −1][−1 1 1 −1][−1 1 −1 1].

Figure 6C:
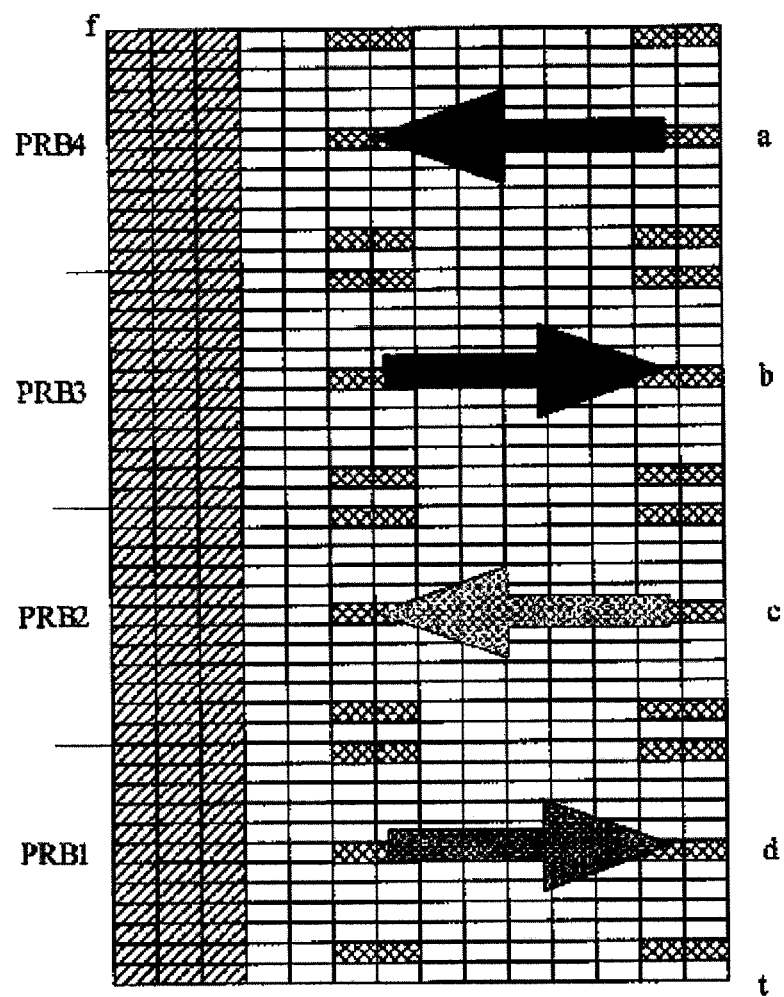
FIG. 6c is a PRB based orthogonal sequence selection scheme with rank5-rank8 at a length of 4.

(3) Per PRB:

FIG. 6c is a PRB based orthogonal sequence selection scheme with rank5-rank8 at a length of 4. Referring to FIG. 6c, an orthogonal sequence for transmission of dedicated pilots in a zone where an arrow denoted with "a" lies is Code index0: [1 1 1 1] [1 1 −1 −1][1 −1 −1 1][1 −1 1 −1]; an orthogonal sequence for transmission of dedicated pilots in a zone where an arrow denoted with "b" lies is Code index1: [1 1 1 1] [−1 −1 1 1][1 −1 −1 1][−1 1 −1 1]; an orthogonal sequence for transmission of dedicated pilots in a zone where an arrow denoted with "c" lies is Code index2: [1 1 1 1] [−1 −1 1 1][−1 1 1 −1][1 −1 1 −1]; and an orthogonal sequence for transmission of dedicated pilots in a zone where an arrow denoted with "d" lies is Code index3: [1 1 1 1] [1 1 −1 −1][−1 1 1 −1][−1 1 −1 1].

The index of an orthogonal sequence can be calculated in the formula of:

Code index=$PRB\_index \mod 4$

The foregoing embodiment address the issue of orthogonal sequence inversion (selection) at a moment of time in a cell, but orthogonal sequence inversion (selection) may be constant with time or vary from one timeslot (or sub-frame) to another. In view of randomized inter-cell interference, orthogonal sequence inversion (selection) of different cells may be the same or different. Furthermore a specific rank or pilot structure may vary without departing from the solution in the embodiment of the invention.

An implementation of the embodiment of the invention will be detailed below in several specific embodiments.

The embodiments will be described taking rank=4 and a sequence selection granularity being a group of sub-carriers as an example, but the invention will not be limited thereto, and the following implementation will be applicable to any sequence selection granularity and any transmission rank (i.e., a configured rank).

The First Embodiment

Figure 7A:
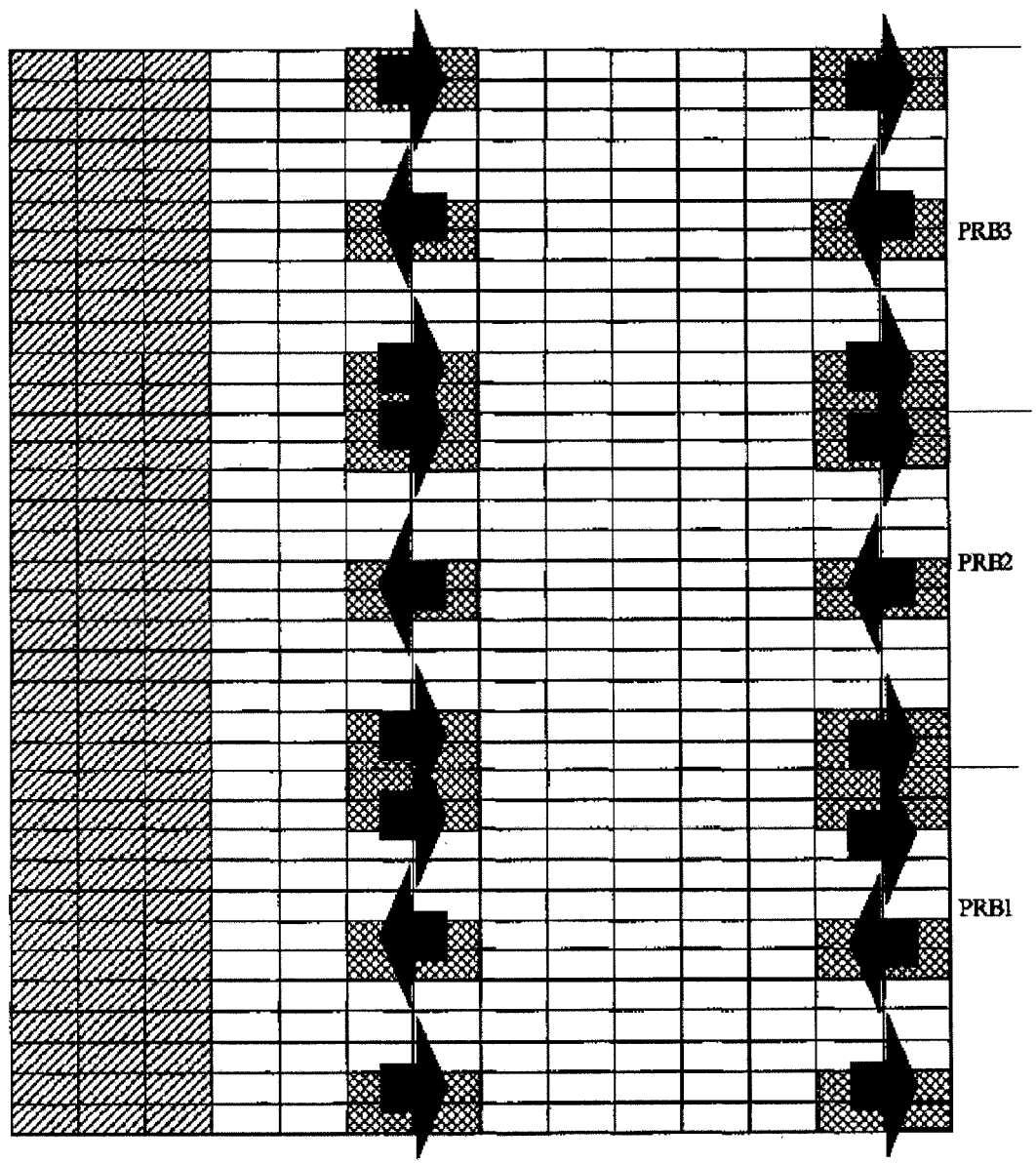
FIG. 7a is sequence selection (or inversion) only in a PRB.

FIG. 7a is sequence selection (or inversion) only in a PRB. Referring to FIG. 7a, there is sequence selection (or inversion) only in a PRB. Different sequences are adopted (or sequences are inverted) for different groups of sub-carriers in a PRB, and the same sequence is adopted (or no sequence is inverted) for different PRBs, as illustrated in FIG. 7a. The sequence adopted in the PRB can be signaled to a user or standard-defined (i.e., defaulted). The user performs channel estimation according to the defaulted or signaled pilot sequences.

The Second Embodiment

Figure 7B:
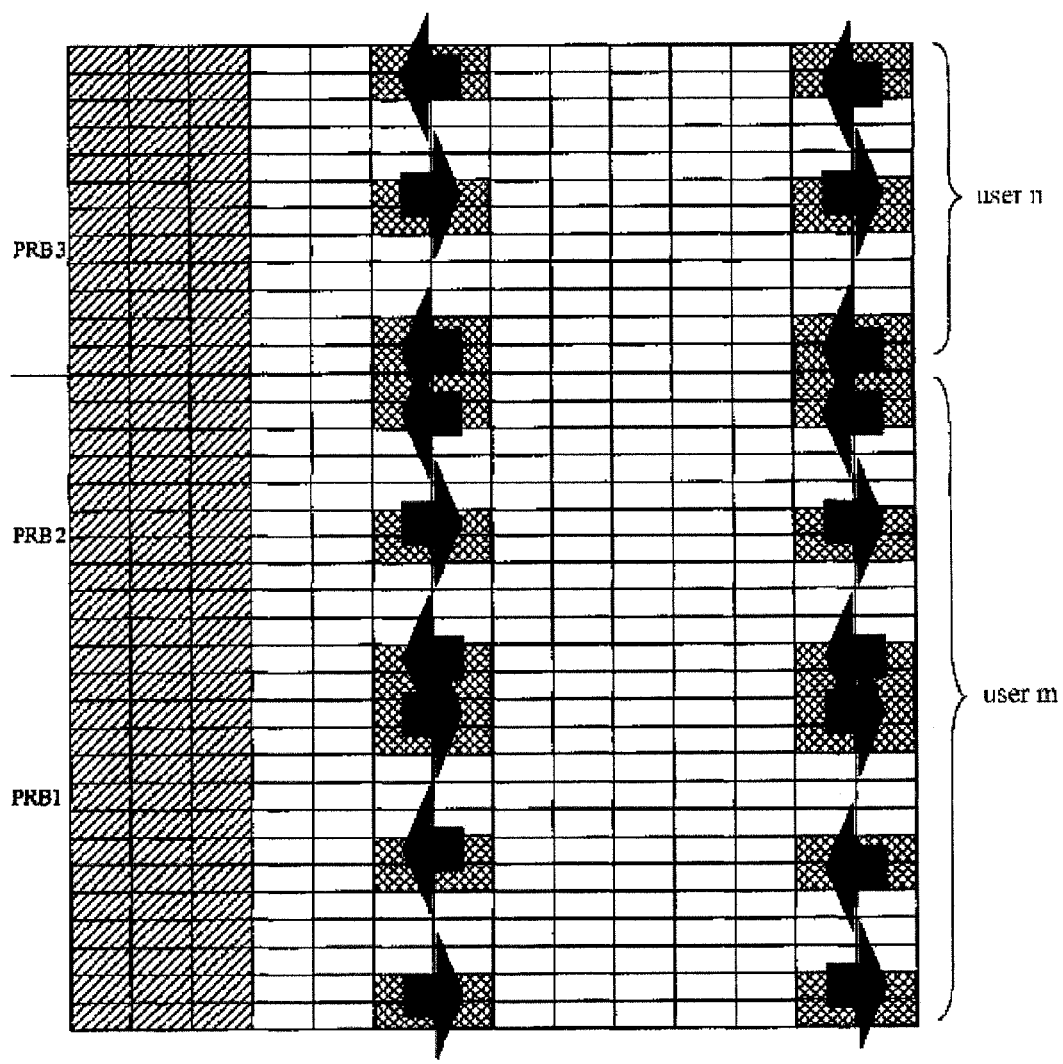
FIG. 7b is sequence selection (or inversion) in a user scheduled resource block.

FIG. 7b is a schematic diagram of sequence selection (or inversion) in a user scheduled PRB. As illustrated in FIG. 7b showing sequence selection (or inversion) in a user scheduled PRB, different sequences are adopted (or sequences are inverted) for adjacent PRBs in a user scheduled resource block. Sequences adopted for a user starting PRB may be standard-defined or broadcast-signaled or DCI signaling-configured; and the base station configures a user with orthogonal pilot sequences according to the sequences adopted in the user starting PRB and an inversion selection (a sequence selection rule). The user performs channel estimation according to the defaulted or signaled pilot sequence.

The Third Embodiment

Figure 7C:
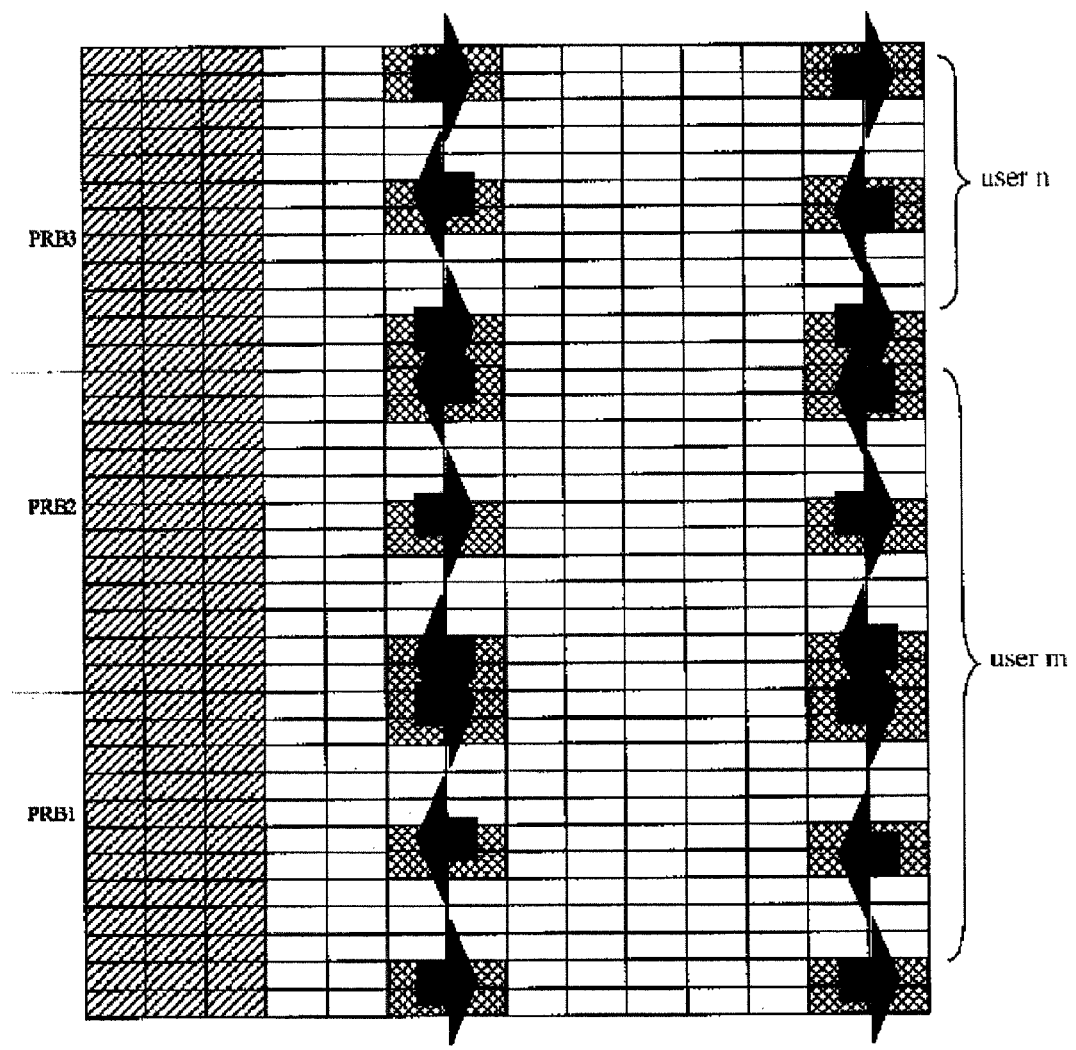
FIG. 7c is sequence selection (or inversion) over a system bandwidth.

FIG. 7c is sequence selection (or inversion) over a system bandwidth. Referring to FIG. 7c, different sequences are adopted (or sequences are inverted) for adjacent PRBs throughout the system bandwidth. Sequences adopted for a starting PRB of the bandwidth may be standard-defined or broadcast-signaled or DCI signaling-configured. The base station configures a user with orthogonal pilot sequences according to the sequences adopted in the starting PRB of the bandwidth and an index value of the PRB. The user performs channel estimation according to the pilot sequences adopt at the transmitter.

An embodiment of the invention provides a system for transmitting downlink data, which includes:

A base station configured to transmit dedicated pilots in the Code Division Multiplexing (CDM) mode or in hybrid of CDM and Frequency Division Multiplexing (FDM) mode, where the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity; and A user equipment configured to receive the dedicated pilots according to obtained frequency-domain granularity information and rule or configuration information of orthogonal sequence sets, wherein the same orthogonal sequence set is adopted for the dedicated pilots in each frequency-domain granularity.

Figure 8:
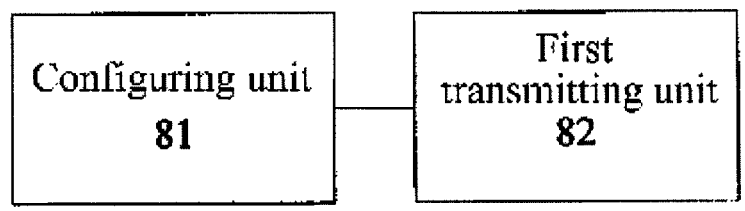
FIG. 8 is a schematic structural diagram of a transmitting apparatus according to an embodiment of the invention.

Referring to FIG. 8, an embodiment of the invention provides an apparatus for transmitting downlink data, which is equivalent to the base station in the system and which includes:

A configuring unit 81 configured to configure dedicated pilots with orthogonal sequence sets over resources for transmission of the dedicated pilots according to a preset frequency-domain granularity and rule by adopting the same orthogonal sequence set for the dedicated pilots per frequency-domain granularity; and A first transmission unit 82 configured to transmit the dedicated pilots in the Code Division Multiplexing (CDM) mode or in hybrid of CDM and Frequency Division Multiplexing (FDM) mode.

The frequency-domain granularity is a sub-carrier, a group of sub-carriers or a resource block PRB.

The configuring unit 81 is configured to adopt one orthogonal sequence set for each sub-carrier and different orthogonal sequence sets for adjacent sub-carriers among sub-carriers for transmission of the dedicated pilots in each resource block when the frequency-domain granularity is a sub-carrier.

The configuring unit 81 is configured to adopt the same orthogonal sequence set in each group of sub-carriers and different orthogonal sequence sets between adjacent groups of sub-carriers among groups of sub-carriers for transmission of the dedicated pilots in each resource block when the frequency-domain granularity is a group of sub-carriers.

The configuring unit 81 is configured to adopt the same orthogonal sequence set over resources for transmission of the dedicated pilots in each resource block when the frequency-domain granularity is a resource block PRB.

The configuring unit 81 is configured to configure the dedicated pilots with orthogonal sequence sets according to the orthogonal sequence set and the sub-carrier sequence number, adopted for the starting sub-carrier of a system bandwidth; or to configure the dedicated pilots with orthogonal sequence sets according to the orthogonal sequence set and the sub-carriers group sequence number, adopted for the starting group of sub-carriers of a system bandwidth; or to configure the dedicated pilots with orthogonal sequence sets according to the orthogonal sequence set and the resource block sequence number, adopted for the starting PRB of a system bandwidth; or to configure the dedicated pilots with orthogonal sequence sets according to the orthogonal sequence set and the sub-carrier sequence number, adopted for the starting sub-carrier of user scheduling; or to configure the dedicated pilots with orthogonal sequence sets according to the orthogonal sequence set and the sub-carrier group sequence number, adopted for the starting group of sub-carriers of user scheduling; or to configure the dedicated pilots with orthogonal sequence sets according to the orthogonal sequence set and the resource block sequence number, adopted for the starting PRB of user scheduling.

The apparatus for transmitting downlink data according to an embodiment of the invention can further include:

A second transmitting unit configured to transmit the dedicated pilots with the configured orthogonal sequence sets to a user equipment so as to be provided to the user equipment for channel estimation.

The second transmitting unit is configured to transmit the configured orthogonal sequence sets in broadcast message or a DCI message.

Figure 9:
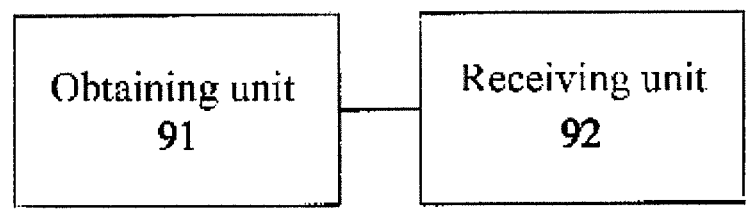
FIG. 9 is a schematic structural diagram of a receiving apparatus according to an embodiment of the invention

Referring to FIG. 9, an embodiment of the invention provides an apparatus for receiving downlink data, which is equivalent to the user equipment in the system and which includes:

An obtaining unit 91 configured to obtain frequency-domain granularity information and rule or configuration information of orthogonal sequence sets; and A receiving unit 92 configured to receive the dedicated pilots according to the obtained frequency-domain granularity information and rule or configuration information of orthogonal sequence sets, where the same orthogonal sequence set is adopted for the dedicated pilots in each frequency-domain granularity.

The frequency-domain granularity is a sub-carrier, a group of sub-carriers or a resource block PRB.

When the frequency-domain granularity is a sub-carrier, one orthogonal sequence set is adopted for each sub-carrier and different orthogonal sequence sets are adopted for adjacent sub-carriers among sub-carriers for transmission of the dedicated pilots in each resource block.

When the frequency-domain granularity is a group of sub-carriers, the same orthogonal sequence set is adopted in each group of sub-carriers and different orthogonal sequence sets are adopted between adjacent groups of sub-carriers among groups of sub-carriers for transmission of the dedicated pilots in each resource block.

When the frequency-domain granularity is a resource block PRB, the same orthogonal sequence set is adopted over resources for transmission of the dedicated pilots in each resource block.

The obtaining unit 91 is configured to obtain the orthogonal sequence sets in the dedicated pilots by receiving a broadcast message or a DCI message, transmitted from a base station, including orthogonal sequences, or to obtain the orthogonal sequence sets in the dedicated pilots from dedicated pilot orthogonal sequence information stored in advance, or to generate the orthogonal sequence sets in the dedicated pilots according to a rule stored in advance.

When there is more than one group of ports and each group of ports corresponds to more than one sub-carrier, the dedicated pilots are transmitted over the same sub-carrier in each group of ports in the CDM mode, and a frequency-domain granularity and/or rule preset for one group of ports is the same as or different from that for another.

When different groups of ports correspond to a frequency-domain granularity which is a sub-carrier, the configuring unit 81 is configured to adopt different orthogonal sequence sets for adjacent sub-carriers for transmission of the dedicated pilots in the same group of ports and different orthogonal sequence sets for starting sub-carriers of different groups of ports.

When a rank-number of system transmission is 3 or 4, the configuring unit 81 is configured to adopt the same orthogonal sequence at data layers of transmission 1 and 3 and an opposite orthogonal sequence at layer 4 to that at layer 2.

The configuring unit 81 is configured to adopt the same or different frequency-domain granularities and rules for different rank-numbers of system transmission.

The invention proposes three types of granularity configuration of a pilot orthogonal sequence to thereby facilitate extensions and implementations of various ranks and presents three methods for performing pilot orthogonal sequence selection (or inversion). The foregoing embodiments present in details the method for sequence inversion (or selection) with rank3-rank8 and the scheme of PRB based inversion (or selection) with rank2 to lower the complexity of sequence mapping. Orthogonal sequence inversion (or selection) does not vary with time or varies from one timeslot (or sub-frame) to another. Orthogonal sequence inversion (or selection) in one cell may be the same as or different from that in another. The method for sequence inversion (or selection) addresses the problem of consistent power due to rank3-rank8 orthogonal sequences and is easy to perform.

Those skilled in the art shall appreciate that the embodiments of the invention can be embodied as a method, system or computer program product. Therefore, the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the apparatus (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing apparatus to produce a machine so that the instructions executed on the computer or the processor of the other programmable data processing apparatus create means for performing the functions specified in the flow(s) of the flow chart and/or the block(s) of the block diagram.

These computer program instructions can also be stored into a computer readable memory capable of directing the computer or the other programmable data processing apparatus to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing apparatus so that a series of operational steps are performed on the computer or the other programmable data processing apparatus to create a computer implemented process so that the instructions executed on the computer or the other programmable apparatus provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting downlink pilots, including the steps of:
   transmitting dedicated pilots in the Code Division Multiplexing, CDM, mode or in hybrid of CDM and Frequency Division Multiplexing, FDM, mode, wherein:
   the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity;
   wherein when there is more than one group of ports and each group of ports corresponds to more than one sub-carrier, the dedicated pilots are transmitted over the same sub-carrier in each group of ports in the CDM mode, and a frequency-domain granularity and/or a rule preset for one group of ports is the same as or different from that for another,
   wherein when different groups of ports correspond to a frequency-domain granularity which is a sub-carrier, different orthogonal sequence sets are adopted for adjacent sub-carriers for transmission of the dedicated pilots in the same group of ports, and different orthogonal sequence sets are adopted for starting sub-carriers of different groups of ports;
   wherein when a rank-number of system transmission is 3 or 4, the same orthogonal sequence is adopted at data layers of transmission 1 and 3, and an orthogonal sequence at layer 4 is opposite to that at layer 2.

2. The method according to claim 1, wherein two orthogonal sequence sets are configured in the same group of ports and alternatively mapped onto sub-carriers for transmission of the dedicated pilots.

3. The method according to claim 1, wherein when the frequency-domain granularity is a sub-carrier, one orthogonal sequence set is adopted for each sub-carrier and different orthogonal sequence sets are adopted for adjacent sub-carriers among sub-carriers for transmission of the dedicated pilots in each resource block.

4. The method according to claim 1, wherein configuring the dedicated pilots with orthogonal sequence sets according to the preset rule comprises:
   configuring the dedicated pilots with orthogonal sequence sets according to an orthogonal sequence set and a sub-carrier sequence number, adopted for a starting sub-carrier of a system bandwidth.

5. An apparatus for transmitting downlink pilots, comprising:
   a configuring unit configured to configure dedicated pilots with orthogonal sequence sets over resources for transmission of the dedicated pilots according to a preset frequency-domain granularity and rule by adopting the same orthogonal sequence set for the dedicated pilots in each frequency-domain granularity; and
   a first transmission unit configured to transmit the dedicated pilots in the Code Division Multiplexing, CDM, mode or in hybrid of CDM and Frequency Division Multiplexing, FDM, mode;
   wherein when there is more than one group of ports and each group of ports corresponds to more than one sub-carrier, the dedicated pilots are transmitted over the same sub-carrier in each group of ports in the CDM mode, and a frequency-domain granularity preset for one group of ports is the same as or different from that for another,
   wherein when different groups of ports correspond to a frequency-domain granularity which is a sub-carrier, the configuring unit is configured to adopt different orthogonal sequence sets for adjacent sub-carriers for transmission of the dedicated pilots in the same group of ports and different orthogonal sequence sets for starting sub-carriers of different groups of ports;
   wherein when a rank-number of system transmission is 3 or 4, the configuring unit is configured to adopt the same orthogonal sequence at data layers of transmission 1 and 3 and an opposite orthogonal sequence at a layer 4 to that at a layer 2.

6. The apparatus according to claim 5, wherein the configuring unit is configured to adopt one orthogonal sequence set for each sub-carrier and different orthogonal sequence sets for adjacent sub-carriers among sub-carriers for transmission of the dedicated pilots in each resource block when the frequency-domain granularity is a sub-carrier.

7. The apparatus according to claim 5, wherein the configuring unit is configured to configure the dedicated pilots with orthogonal sequence sets according to an orthogonal sequence set and a sub-carrier sequence number, adopted for a starting sub-carrier of a system bandwidth.

8. The apparatus according to claim 5, wherein two orthogonal sequence sets are configured in the same group of ports and alternatively mapped onto sub-carriers for transmission of the dedicated pilots.

9. A system for transmitting downlink pilots, comprising:
   a base station configured to transmit dedicated pilots in the Code Division Multiplexing, CDM, mode or in hybrid of CDM and Frequency Division Multiplexing, FDM, mode, wherein the dedicated pilots are configured with orthogonal sequence sets over resources for transmission of the dedicated pilots according to a preset frequency-domain granularity and rule and the same orthogonal sequence set is adopted for the dedicated pilots in each frequency-domain granularity; and a user equipment configured to receive the dedicated pilots according to obtained frequency-domain granularity information and rule or configuration information of orthogonal sequence sets, wherein the same orthogonal sequence set is adopted for the dedicated pilots in each frequency-domain granularity;

wherein when there is more than one group of ports and each group of ports corresponds to more than one sub-carrier, the dedicated pilots are transmitted over the same sub-carrier in each group of ports in the CDM mode, and a frequency-domain granularity preset for one group of ports is the same as or different from that for another, wherein when different groups of ports correspond to a frequency-domain granularity which is a sub-carrier, the base station is configured to adopt different orthogonal sequence sets for adjacent sub-carriers for transmission of the dedicated pilots in the same group of ports and different orthogonal sequence sets for starting sub-carriers of different groups of ports;

wherein when a rank-number of system transmission is 3 or 4, the base station is configured to adopt the same orthogonal sequence at data layers of transmission 1 and 3 and an opposite orthogonal sequence at a layer 4 to that at a layer 2.

10. The system according to claim 9, wherein the base station is configured to adopt one orthogonal sequence set for each sub-carrier and different orthogonal sequence sets for adjacent sub-carriers among sub-carriers for transmission of the dedicated pilots in each resource block when the frequency-domain granularity is a sub-carrier.

11. The system according to claim 9, wherein the base station is configured to configure the dedicated pilots with orthogonal sequence sets according to an orthogonal sequence set and a sub-carrier sequence number, adopted for a starting sub-carrier of a system bandwidth.

12. The system according to claim 9, wherein two orthogonal sequence sets are configured in the same group of ports and alternatively mapped onto sub-carriers for transmission of the dedicated pilots.

* * * * *